United States Patent [19]

Janik et al.

[11] Patent Number: 5,489,384

[45] Date of Patent: Feb. 6, 1996

[54] SINGLE STAGE FUEL FILTER WITH SEAL CONTROL AIR PURGE

[75] Inventors: Leon P. Janik, Suffield; M. Craig Maxwell, Colchester, both of Conn.

[73] Assignee: Stanadyne Automotive Corp., Windsor, Conn.

[21] Appl. No.: 316,508

[22] Filed: Sep. 30, 1994

Related U.S. Application Data

[63] Continuation-in-part of Ser. No. 166,226, Dec. 13, 1993.

[51] Int. Cl.$^6$ ..................................................... B01D 27/08
[52] U.S. Cl. ........................... 210/436; 210/438; 210/440; 210/441; 210/450
[58] Field of Search ................................. 210/188, 436, 210/472, 440, 441, 450; 96/204, 219, 220

[56] References Cited

U.S. PATENT DOCUMENTS 3,239,064  3/1966  White ................................. 210/416.4
5,017,285  5/1991  Janik et al. ............................ 210/232

FOREIGN PATENT DOCUMENTS

0442356A2  8/1991  European Pat. Off. ..
0547951A1  6/1993  European Pat. Off. ..

Primary Examiner—Matthew O. Savage
Attorney, Agent, or Firm—Chilton, Alix & Van Kirk

[57] ABSTRACT

A fuel filter assembly employs a base which mounts a disposable filter cartridge. A pair of axial conduits in the base provide fluid communication between the base and the cartridge. An axial sealing member mounted in the cartridge receives the axial conduits. An axial conduit and preferably at least one baffle positioned on the axial conduit outer surface within the cartridge provide a flow path through the cartridge. An orifice located in the cartridge axial conduit provides a bleed vent which controls the size and flow rate of air bubbles in filtered fuel exiting the fuel filter. A flange-shaped end of the cartridge axial conduit engages a ridge on the outside surface of the sealing member to prevent the fuel flow from bypassing the baffle.

18 Claims, 4 Drawing Sheets

5,489,384

SINGLE STAGE FUEL FILTER WITH SEAL CONTROL AIR PURGE

This is a continuation-in-part of application Ser. No. 09/166,226, filed Dec. 13, 1993.

BACKGROUND OF THE INVENTION

This invention relates generally to devices for filtering and separating liquids. More particularly, the present invention relates to filters for the fuel supply system or lubricating oil of an internal combustion engine and removing foreign particles and separating water therefrom.

The absence of high standards of quality control in diesel fuel supplies dictates that an effective fuel filter be incorporated into the fuel supply system of a diesel engine. It is not uncommon for diesel fuel to have significant quantities of abrasive particles and water. The abrasive particles present the potential for permanent damage to components of the fuel injection pump. The abrasive particles can also adversely affect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components. Similarly, water and particulate matter in the lubricating oil must be removed to minimize wear of engine parts.

Commonly, filters employ a disposable filter cartridge which is replaced at pre-established intervals of filter usage. The cartridge is secured to a base assembly that is fixedly mounted to the engine header or some other fixed location.

Current filter assemblies require a plurality of seals to seal the cartridge to the base assembly. The cartridge and base assembly are sealed to ensure that the fluid being filtered does not bypass the filter element in the cartridge. Additional seals may be employed to prevent short circuiting internal flow paths within the cartridge. The use of multiple seals increases the number of components, thereby increasing the cost of manufacture. In addition, the use of multiple seals increases the probability that a leak will occur.

For most, if not all diesel fuel delivery systems, as fuel circulates through the fuel filter, air pockets are formed in the fuel filter. The air pockets normally form at the top of the fuel filter. Air bubbles tend to form in the fuel as a result of gassing when exposed to changes in pressure. For pressurized fuel delivery systems, the air pockets tend to disintegrate over time and/or the stream of bubbles present in the fuel is of a relatively small magnitude. The air pockets generally do not result in the formation of large air bubbles in the fuel supply partly due to the vapor pressure of the pressurized fuel. Consequently, for pressurized systems, air pockets in the fuel filter do not present a significant problem or obstacle to the circulation of fuel through the fuel filter and the delivery of fuel to the engine.

However, in vacuum applications, the formation of air pockets in the fuel circulating through the filter can present a more significant problem. The air pockets are much more resistant to absorption over time in vacuum systems. Moreover, the vacuum suction exerted may result in the formation of tiny air bubbles or "gassing" in the fuel. This is especially true as the filter element approaches the end of its useful life and the pressure drop across the filter media increases. This increasing restriction to flow causes more air to be pulled from the fuel as the differential pressure between the clean side and the dirty side increases. In of themselves, these individual tiny bubbles do not present a problem to normal vehicle operation as they are easily ingested by the fuel injection pump. When subjected to pump charging pressures, the tiny bubbles are ordinarily reabsorbed by the fuel.

The problems in vacuum suction systems initially arise on the clean side of the filter element where the small bubbles inevitably collect, agglomerate and form air pockets, e.g., large bubbles. The large bubble formation will continue over a period of time until the physical attitude of the filter element changes due to vehicle maneuvering, etc. When these relative large air pockets or bubbles escape into the fuel flow, they are not easily ingested and may cause engine operating problems such as stalling or engine misfire.

SUMMARY OF THE INVENTION

Briefly stated, the invention in a preferred form is a fuel filter assembly which incorporates a filter cartridge having internal baffles and an internal vent to control air bubble formation and its adverse effects. The invention implements an improved seal to establish a controlled bleed path within the filter cartridge to meter the stream of air bubbles in the fuel supply exiting the filter.

The fuel filter is preferably of a type which includes a base which has a fuel inlet and a fuel outlet. A conduit interiorly defines a first axial passage which communicates with the inlet. A second conduit surrounds the first conduit and defines a second axial passage. The second axial passage communicates with the outlet.

The filter cartridge, which is mountable to the base, preferably includes at least one pleated filter element. The filter cartridge has a central axial bore that is dimensioned to receive the conduits. A sealing grommet mounted at the bore upper opening diametrally fluidically seals against the outer conduit. A first conduit disposed in the filter cartridge bore extends upward from a medial plate. The first conduit upper end defines a flange which receives the lower portion of the first sealing grommet. The inside surface of the flange seals against an outer circumferential ridge of the first sealing grommet. A second sealing grommet mounted adjacent the first conduit upper end diametrally seals against the inner base conduit. Fluted baffles angularly disposed on the first cartridge conduit outer surface are in fluid communication with the second base outlet conduit adjacent the first sealing grommet. A vent orifice opens radially through the first cartridge conduit adjacent the second sealing grommet. The orifice is dimensioned and located to limit and control the rate of escape and the size of air bubbles. The baffles define a flow path which tends to separate air bubbles from the fuel and thereby form an upper bubble collection zone within the cartridge since the bubbles tend to resist traversing downwardly around the baffles.

An object of the invention is to provide a new and improved filter adaptable for use in filtering fuel or lubricating oil supplied to an internal combustion engine.

Another object of the invention is to provide a new and improved fuel filter having an effective low-cost seal.

A further object of the invention is to provide a new and improved fuel filter of efficient low cost construction which is especially adapted for incorporation into a fuel supply system which operates under a vacuum.

A still further object of the invention is to provide a new and improved filter which employs a disposable cartridge incorporating improved means for controlling the flow, the rate of escape, and the size of air bubbles in the fluid exiting the filter.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
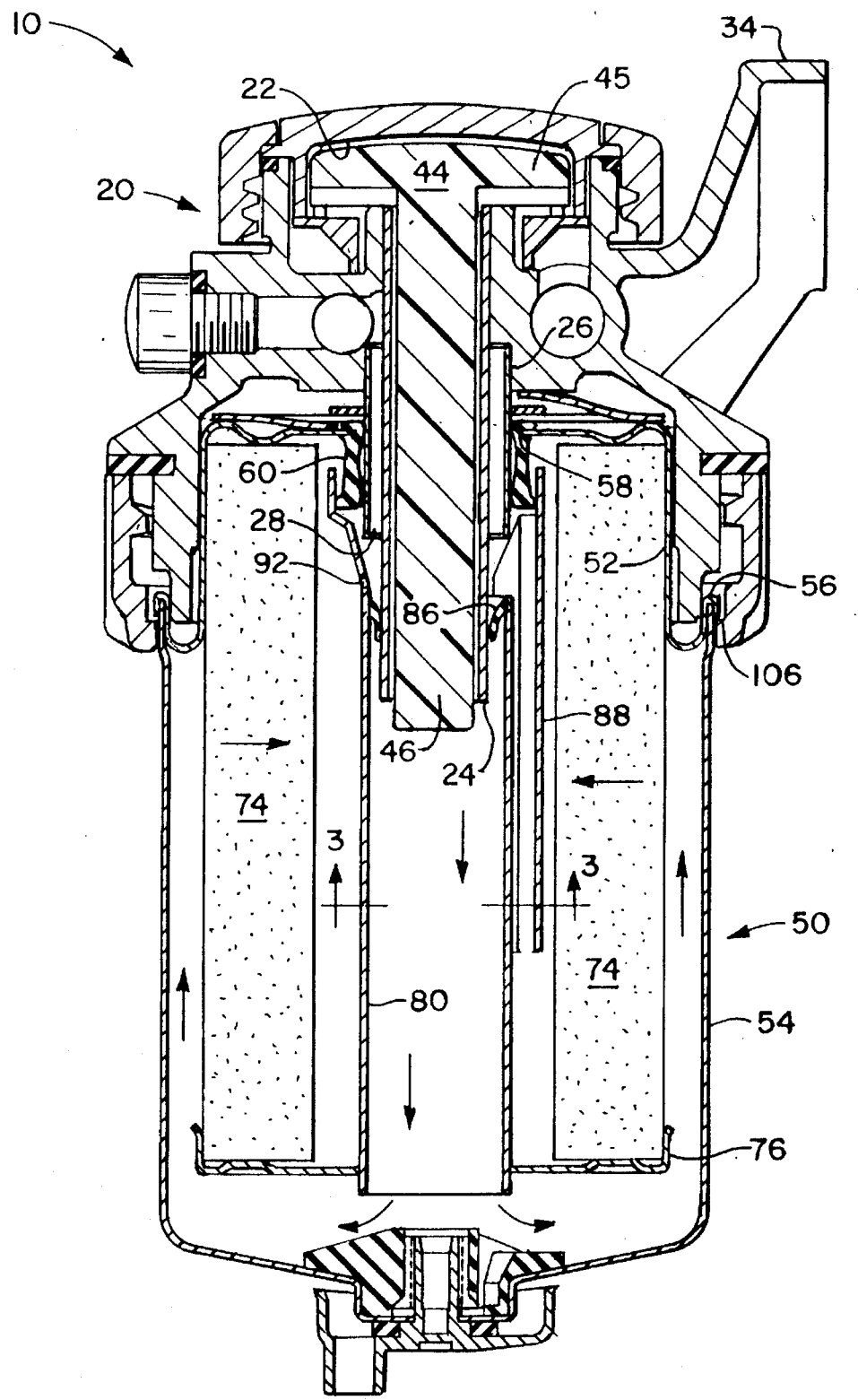
FIG. 1 is a sectional view of a fuel filter assembly in accordance with one embodiment of the invention.

With reference to the drawings wherein like numerals represent like parts throughout the several figures, a fuel filter assembly in accordance with the present invention is generally designated by the numeral 10. The filter assembly 10 is adapted for incorporation into the fuel supply system or lubricating oil system of an internal combustion engine (not illustrated), such as a diesel engine, for removing particulate matter from the fuel or oil and for separating water from the fuel or oil. The fuel filter assembly 10 is particularly adapted for incorporation into a fuel supply system which is operated under a vacuum.

Filter assembly 10 comprises a base assembly 20 and a disposable filter cartridge 50. The base assembly 20 is fixedly mounted to the engine header or other fixed location of the vehicle. Filter cartridge 50 is secured to the base assembly 20 by means of a retainer collar 100.

The base assembly 20 and the disposable cartridge 50 may assume a wide variety of configurations. For the disclosed embodiment, the base is an inverted cup-like receptacle which forms a skirt defining a lower receiving cavity for upper portions of a disposable cartridge. An elongated sleeve-like conduit 24 and an outer concentric sleeve-like conduit 26 having an axial end 28 provide generally co-axial fluid communication between the base and the disposable cartridge.

Figure 4:
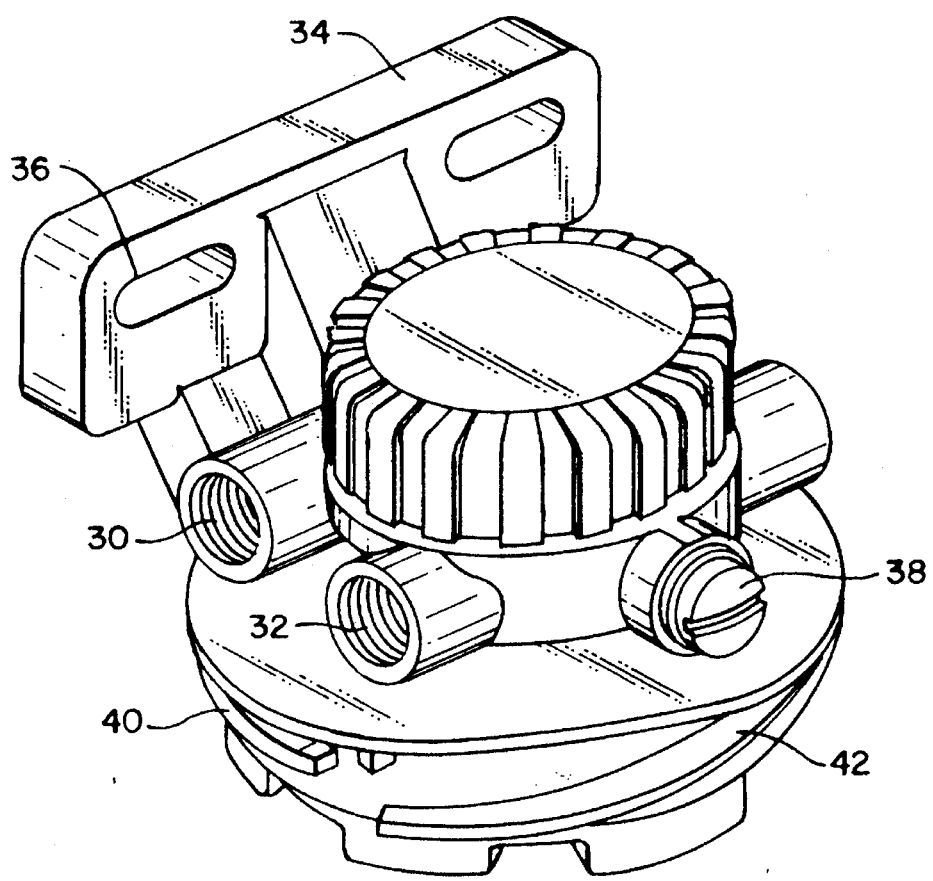
FIG. 4 is a perspective view of the base portion of the fuel filter assembly of FIG. 1.

With reference to FIG. 4, an inlet connector 30 at an upper side location of the base connects with the fuel line (not illustrated) to ultimately provide fluid communication through the interior passageway defined by the first conduit 24. An outlet connector 32 at an upper side location of the base connects with the fuel line to provide external fluid communication from the axial fluid conduit defined between the first and second conduits 24 and 26.

An integral projecting bracket 34 which may include a pair of openings 36 for anchoring the filter base to the engine header extends transversely from the base, as shown in FIG. 1. Alternately, the base may not employ the described bracket structure but instead include a pair of fastener openings for receiving mounting fasteners. The base may also have an external air vent 38.

The base assembly 20 defines an interior cavity 22. A plug 44 may be disposed in the base assembly 20 such that shoulder 45 and an axially projecting column 46 of the plug occupy a substantial portion of the cavity 22 and the first conduit 24, respectively. The plug column 46 may extend the entire length of the conduit 24 and project slightly beyond the lower terminus thereof. The plug 44 may be composed of plastic or other suitable material and may have a solid or hollow core. As explained in U.S. Pat. No. 5,312,546, assigned to the assignee of the present invention and the disclosure of which is incorporated herein by reference, the plug occupies a pre-established cartridge volume. When the filter cartridge 50 is axially dismounted from the base, the fuel cartridge 50 essentially gains free volume. The free volume gain allows for the fuel cartridge 50 to capture any fuel which may drain from the base.

Figure 2:
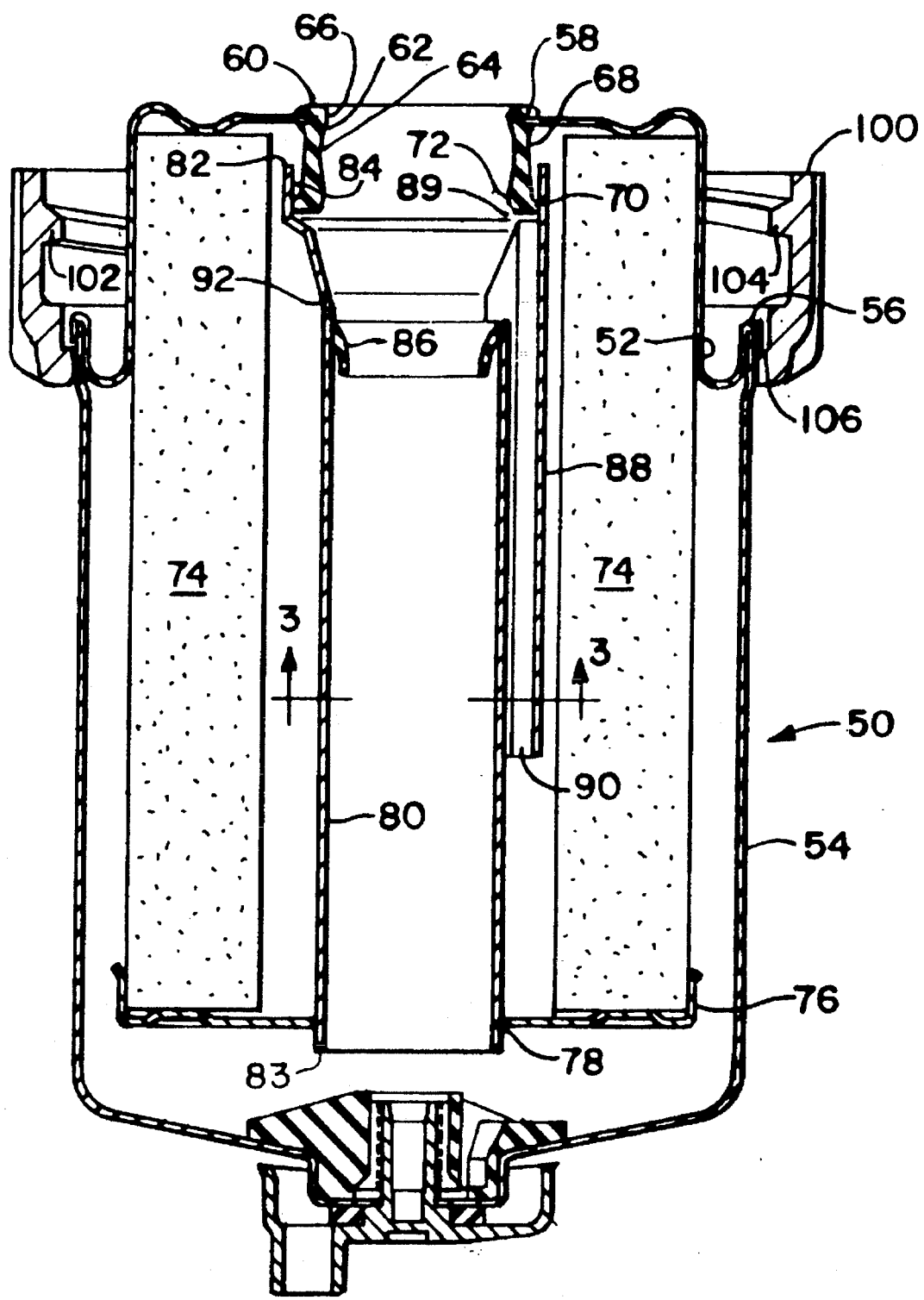
FIG. 2 is an enlarged sectional view of the fuel filter cartridge of the filter assembly of FIG. 1.

With reference to FIG. 2, the disposable filter cartridge 50 comprises a can-like enclosure formed by a pair of opposed lower and upper cup-like sections 52, 54. The sections are joined along a circumferential roll seam 56. The upper section 52, which is smaller in diameter than the lower section, is received by the base receptacle. The upper section 52 is dimensioned to be closely accommodated in the base receptacle. A central axial opening 58 in the upper section is dimensioned to receive the conduits 24 and 26. A sealing grommet 60 mounted at the opening 58 diametrally fluidically seals against the outer conduit 26. The inside surface 62 of the grommet 60 has a shallow circumferential groove 64 defining a pair of circumferential ridge-like seal surfaces 66. The outside surface 68 of the grommet 60 has a circumferential ridge 70 on the lower portion 72 of the grommet 60.

The cartridge may employ a dual stage filter assembly or a single stage assembly as illustrated in FIGS. 1 and 2. A filter element 74 which has a continuous fan-shaped pleated configuration is mounted in the enclosure. The lower end of the element 74 is engaged by a medial plate 76 having a central opening 78. A tubular conduit 80 extends upward from the medial plate 76. The tubular conduit upper end 82 defines a throat of enlarged diameter which receives the lower portion 72 of the grommet 60. The inside surface 84 of the conduit upper end 82 seals against the outer circumferential ridge 70 of the grommet 60.

The second conduit 26 is received by the first sealing grommet 60 when the filter cartridge 50 is axially installed. The outer surface of the second conduit 26 is engaged by the seal surfaces 66 of the first sealing grommet 60, sealing the second conduit 26 and the filter cartridge 50. The axial force developed by the engagement of the second conduit 26 and the first sealing grommet 60 causes the outside circumferential ridge 70 of the first sealing grommet 60 to more firmly engage the inside surface 84 of the conduit upper end 82.

Figure 3:
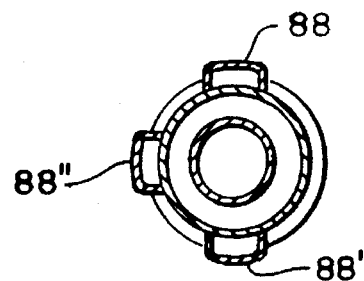
FIG. 3 is a fragmentary sectional view of the fuel filter cartridge of FIG. 2 taken along the line 3—3 thereof.

In a preferred embodiment, a second sealing grommet 86 extends from the inside surface of the tubular conduit 80 intermediate the upper end 82 and the medial plate 76, as shown in FIG. 2. The second sealing grommet 86 is integrally molded with the tubular conduit 80 and is composed of thermoplastic. Alternatively, the second sealing grommet 86 may be composed of an elastomeric material and mounted inside the tubular conduit 80 intermediate the upper end 82 and the medial plate 76. The second sealing grommet 86 diametrally seals against the first conduit 24. At least one axially extending fluted baffle 88 is integrally disposed on the tubular conduit 80 outer surface. The fluted baffle 88 is in fluid communication with the upper portion of the tubular conduit 80 via a first opening 89 positioned adjacent the first grommet 60. The baffles each have an opening 90 at their lower ends and function as axial fluid passageways which ultimately communicate with the outlet conduit 26 of the base. For the embodiment illustrated in FIG. 3, three angularly spaced fluted baffles 88, 88' and 88" are employed. The fluted baffles 88 define a flow path which tends to separate the air bubbles from the fuel flowing through the filter. The bubbles resist traversal around the lower end of the baffles through the openings 90. Consequently, a bubble collection zone is created and continuously maintained at the upper portion of the cartridge on the clean side of the filter. The baffles 88 thus function as barriers to the bubble flow from the filter cartridge.

Figure 5:
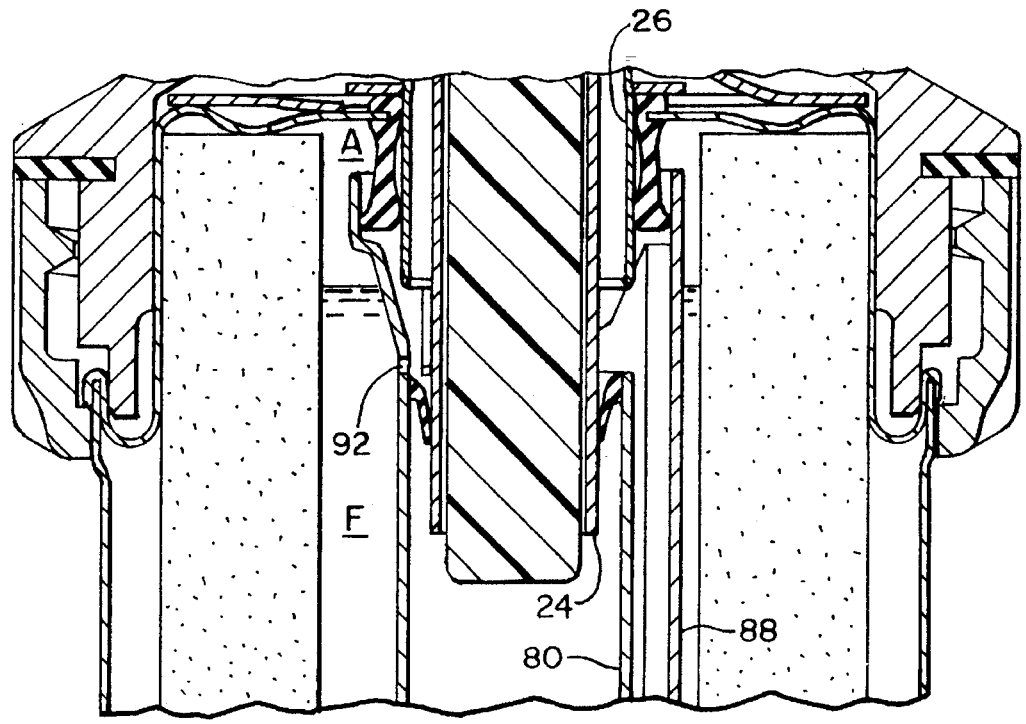
FIG. 5 is an enlarged fragmentary sectional view, partly in schematic, of the fuel filter assembly of FIG. 1 illustrating the invention for a first fuel level.
Figure 6:
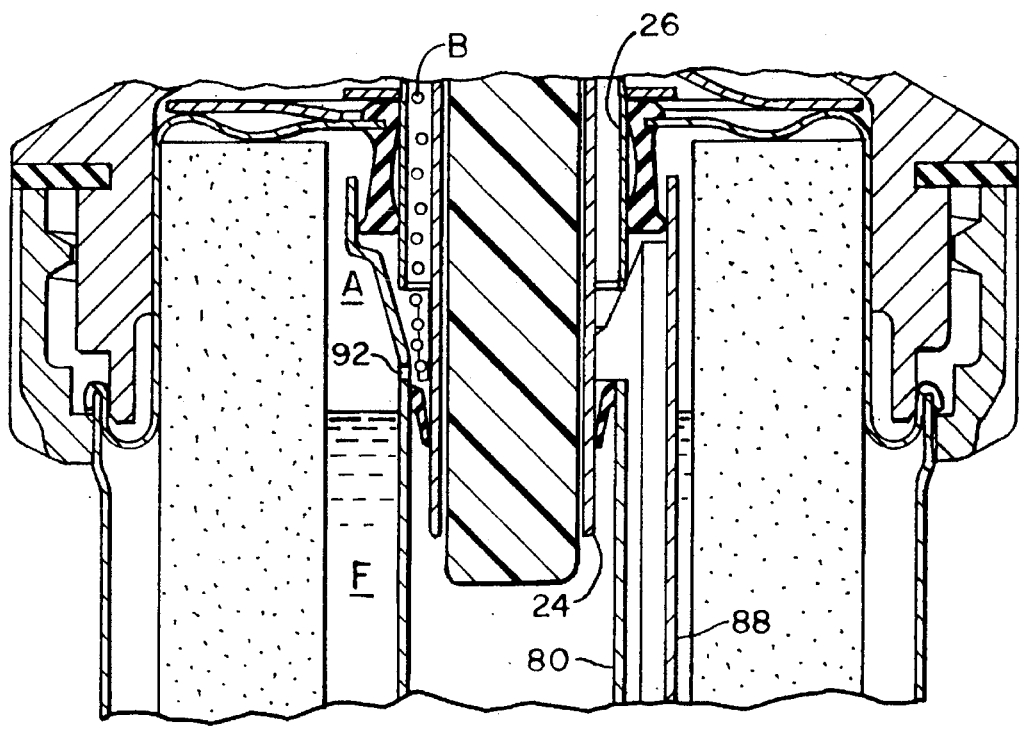
FIG. 6 is an enlarged fragmentary sectional view, partly in schematic, of the fuel filter assembly of FIG. 1 illustrating the invention for a second fuel level.

With reference to FIGS. 5 and 6, at least one vent orifice 92 opens radially through the tubular conduit 80 intermediate the second sealing grommet 86 and the baffle first opening 89. As shown in FIG. 2, the vent orifice 92 is positioned intermediate both the first sealing grommet 60 and the second sealing grommet 86 and the conduit upper end 82 and the conduit lower end 83. The orifice 92 is dimensioned and located to limit the size of air bubbles and to meter the flow of collected air bubbles to the upper end of conduit 80 and to the outlet conduit 26. Additional vent orifices 92' may be axially spaced from the first vent orifice 92 to function as metering orifices if orifice 92 becomes plugged. The diameters of the orifices 92 in one embodiment are each approximately 0.015 inches.

The base may include a pair of integral outwardly projecting diametrically opposed ramps 40 and 42, as shown in FIG. 1. The ramps ascend in spiral-like fashion around the base. The upper ends of the ramps are beveled. The collar includes a pair of diametrically disposed spiral followers 102 and 104 which integrally extend inwardly from the collar. The followers 102, 104 are dimensioned and positioned for engagement with the ramps 40, 42 so that the followers slidably engage and ascend the ramps upon alignment and angular rotation of the collar. The foregoing ramp and spring configuration may be substantially identical to that disclosed in co-pending U.S. patent application Ser. No. 07/746,693 filed on Aug. 16, 1991, which application is assigned to the assignee of the present invention and the disclosure of which is incorporated herein by reference. The collar 100 includes an inwardly projecting annular shoulder 106 which engages the roll seam 56 of the cartridge for releasably locking the cartridge to the base.

The fuel enters the fuel filter assembly 10 through the fuel inlet passage and exits the filter through the outlet passage. The general flow path of the fuel through the filter assembly is generally designated by the FIG. 1 arrows. It will be appreciated that the fuel flow path initially axially traverses through the interior of the inner conduit 24. The circulation path extends generally axially upwardly and generally radially through the filter element 74 with the inflow path through the base first conduit 24 and the cartridge conduit 80 and the return flow path through the fluted baffles 88 and traversing between the inner conduit 24 and the outer conduit 26.

With reference to FIG. 5, when the level of fuel F is above the orifice 92, fuel bleeds into the return passageway between conduits 24 and 26. The lower portion of the return passageway is filled with fuel. The orifice 92 allows for a generally continuous bleeding of fuel between the interior chamber formed by the filter element 74, the upper portion of conduit 80 and the lower end of conduit 26, provided the level of fuel F in the filter is at or above the height of the orifice 92. When the filter is initially filled such as with a hand primer, the fuel level will ordinarily not level off or deadhead within the filter cartridge until the fuel level covers the orifice 92. Therefore, the air space A above the fuel F will be limited by the position and dynamics of the orifice 92.

The orifice 92 functions as a bleed vent to control the formation of air bubbles in the fuel flow path particularly as the level of the fuel in the filter changes, such as may, for example, result from vehicle movement or cartridge attitude shifts. When the engine is started, a vacuum head draws fuel upwardly through the return passageway between conduits 24 and 26. If the level of fuel descends to a position which at least partially uncovers orifice 92, such as illustrated in FIG. 6, air will bleed in a controlled fashion through the orifice 92 into the filtered fuel traversing the return passageway. The intermittent stream of air bubbles B will have no or a negligible effect on the delivery of fuel since the bubbles B will be relatively small in size. The orifice 92 functions to meter the flow of tiny bubbles above the fuel level by providing the air bleed to the return passage. The baffles function as barriers to limit the flow of bubbles to the outlet stream from the clean side of the filter element and to cause the bubbles to collect and be essentially stored at the interior top portion of the cartridge on the clean side of the filter.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter cartridge comprising:

container means for forming a housing defining an axis and having a first end defining an axial opening, and an axially spaced second end;

first sealing means mounted in said axial opening, said first sealing means comprising an elastomeric member defining an axial opening, said first sealing means further comprising an inner surface and an outer surface, said outer surface having a first circumferential sealing surface;

filter means disposed in said housing comprising a filter element having a first end and an axially spaced second end and defining a central inner region on one side of said element and an outer region on the opposing side of said element, said first end of said filter element being substantially adjacent said first end of said container means;

end-cap means mounted to said filter element second end, said end-cap means defining a central opening;

conduit means disposed in said filter element inner region, said conduit means having axially opposite first and second ends, said conduit means second end being mounted to said end-cap means, wherein said conduit means is substantially coaxial with said central opening, said conduit means first end defining an annular throat having an inside surface which seals with said first circumferential sealing surface;

second sealing means disposed in said conduit means intermediate said first and second ends for sealing with a conduit received therein;

baffle means extending from said conduit means and defining an axial passage, said baffle means being in fluid communication with an interior of said conduit means intermediate said first and second sealing means; and vent means disposed in said conduit means intermediate said first sealing means and said second sealing means for defining a vent orifice.

2. The filter cartridge of claim 1 wherein said second sealing means comprises a grommet integrally molded with said conduit means.

3. The filter cartridge of claim 1 wherein said second sealing means comprises an inside surface defining a seal surface.

4. The filter cartridge of claim 1 wherein said first sealing means further comprises a first end portion adjacent said axial opening of said container means and an axially spaced second end portion, said first circumferential sealing surface extends from said second end portion of said outer surface.

5. The filter cartridge of claim 1 wherein said baffle means comprises a plurality of axially extending fluted baffles, said baffles being angularly spaced about said axis.

6. The filter cartridge of claim 1 further comprising a second vent orifice axially spaced from said first vent orifice.

7. The filter cartridge of claim 1 wherein said first sealing means inner surface comprises a grommet defining inner axially spaced second and third seal surfaces.

8. A filter cartridge comprising:

a housing defining an axis and having a first end defining an axial opening and an axially spaced second end;

a pleated filter element disposed in said housing having a first end and an axially spaced second end, said first end of said filter element being substantially adjacent said first end of said container means, said filter element defining a central inner region on one side of said element and an outer region on the opposing side of said element;

first sealing means mounted to said opening, said first sealing means comprising a sealing grommet, said sealing means further comprising an inner surface and an outer surface, said outer surface having a circumferential seal surface;

a conduit means disposed in said filter element inner region coaxial to said opening, said conduit means having axially opposite first and second ends, said first end of said conduit means being substantially adjacent said first end of said filter element, said conduit means first end defining a throat for receiving said sealing means, said throat defining a seal surface which engages and seals with said sealing means circumferential seal surface;

baffle means defining a passage disposed in generally parallel relationship to said conduit means, said passage being in fluid communication with an interior of said conduit means at a location adjacent said first sealing means; and vent means disposed in said conduit means for defining a vent orifice.

9. The filter cartridge of claim 8 further comprising second sealing means positioned intermediate said conduit means first and second ends.

10. The filter cartridge of claim 9 wherein said second sealing means comprises a grommet integrally molded with said conduit means.

11. The filter cartridge of claim 9 wherein said second sealing means comprises an inside surface defining a seal surface.

12. The filter cartridge of claim 8 wherein said vent means is positioned intermediate said second sealing means and said first sealing means.

13. The filter cartridge of claim 8 wherein said baffle means comprises a plurality of fluted structures having axial openings, said structures being angularly spaced about said axis.

14. The filter assembly of claim 8 further comprising a second orifice axially spaced from said vent orifice.

15. A fuel filter assembly comprising:

base means comprising a base defining an axis and having a fuel inlet, a fuel outlet, first conduit means for interiorly defining a first axial passage, first path means for providing fuel communication between said first axial passage and said inlet, second conduit means for defining a second axial passage, second path means for providing fuel communication between said second axial passage and said outlet;

filter cartridge means mountable to said base means for filtering fuel, said cartridge means comprising housing means defining an enclosure, said housing means containing at least one generally cylindrical filter element for dividing said housing into a prefilter space located between said housing and filter element and a filtrate space contained within said filter element, and cartridge conduit means for defining an axial passage through said filter element, said housing having an upper end portion defining an axial opening for receiving said first conduit means and said second conduit means of said base, wherein said cartridge conduit means has an upper end proximate said upper axial opening for receiving said first and second conduit means and a lower end communicating with said prefilter space, first seal means for sealing said second conduit means of said base with said cartridge means end portion and second seal means for sealing said first conduit means of said base with said cartridge conduit means when said cartridge means is mounted to said base means, said first seal means having an outside surface with a circumferential seal surface, said cartridge conduit means comprising a first section located between said upper end and said second seal means, wherein said first section has a seal surface surrounding said circumferential seal surface of said first seal means, wherein said seal surface of said first section engages said circumferential seal surface of said first seal means, wherein said first section defines an annular channel axially located between said first and second seal means and communicating with said second conduit means, said cartridge conduit means comprising at least one axially extending baffle defining a passage extending between said annular channel and said filtrate space to provide fluid communication between the annular channel and said filtrate space, said filter cartridge means further comprising vent means defining a vent orifice disposed in said cartridge conduit means and communicating with said annular channel; and retainer means for retaining said filter cartridge means with said base means.

16. The fuel filter assembly of claim 15 further comprising a second vent orifice axially spaced from said first vent orifice.

17. The filter cartridge of claim 15 wherein said second sealing means comprises a grommet integrally molded with said cartridge conduit means.

18. The filter cartridge of claim 15 wherein said second sealing means comprises a seal, said seal being mounted in said conduit means.

* * * * *